Figure 1:
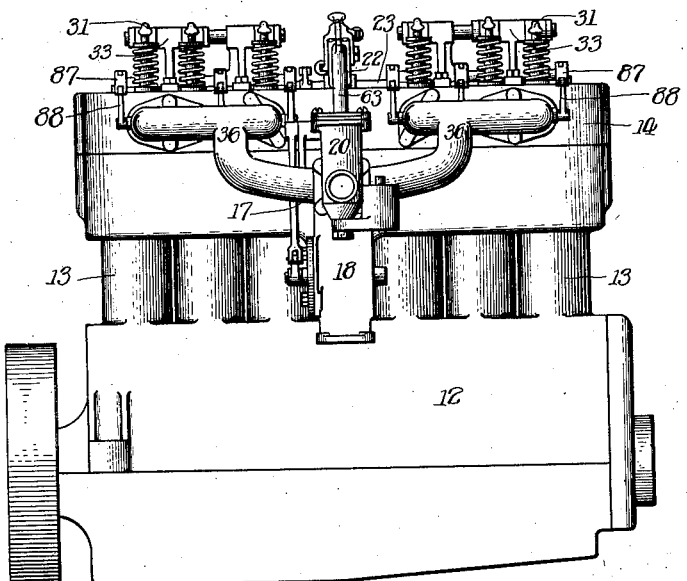

June 24, 1930.  H. A. TRUSSELL  1,766,854
FUEL VAPORIZATION AND INDUCTION SYSTEM FOR INTERNAL COMBUSTION ENGINES
Filed June 29, 1922  3 Sheets-Sheet 1

Witness:
A. J. Sauser

Inventor:
Homer A. Trussell

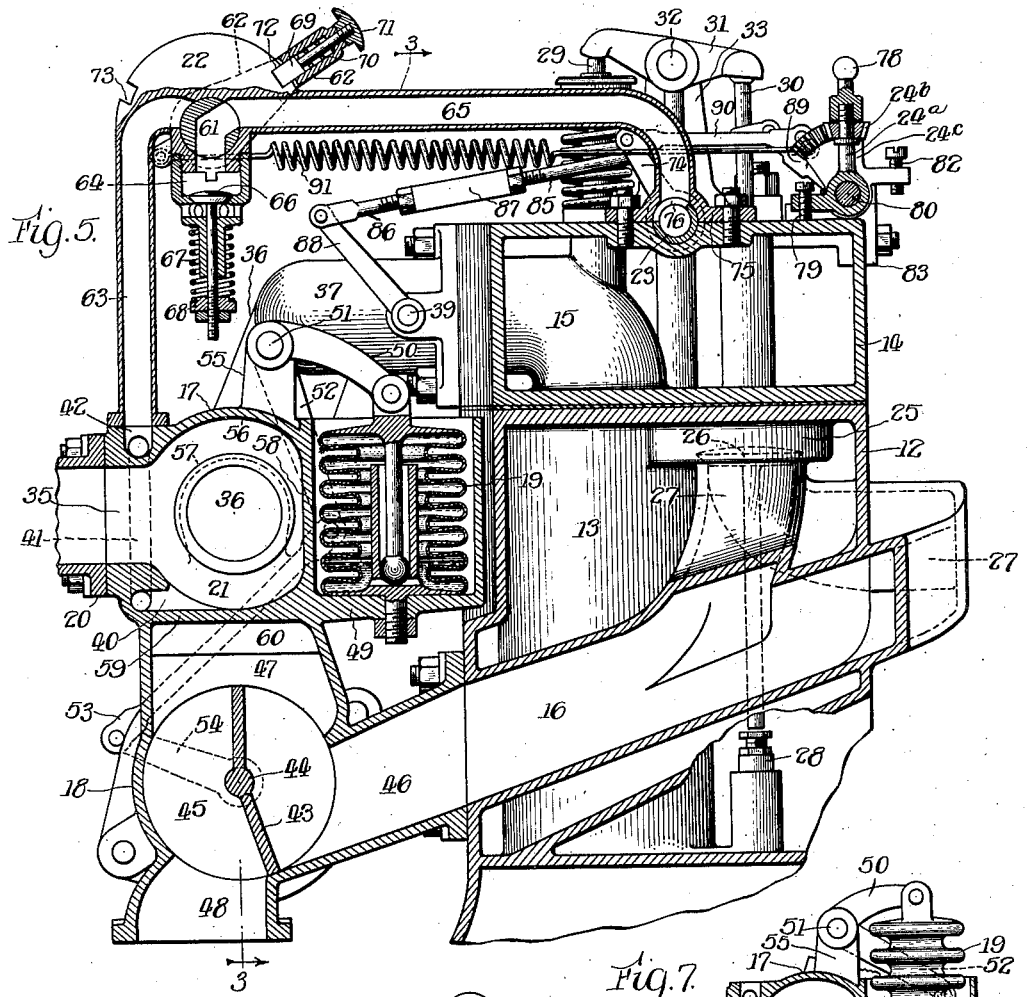

June 24, 1930.  H. A. TRUSSELL  1,766,854
FUEL VAPORIZATION AND INDUCTION SYSTEM FOR INTERNAL COMBUSTION ENGINES
Filed June 29, 1922  3 Sheets-Sheet 3
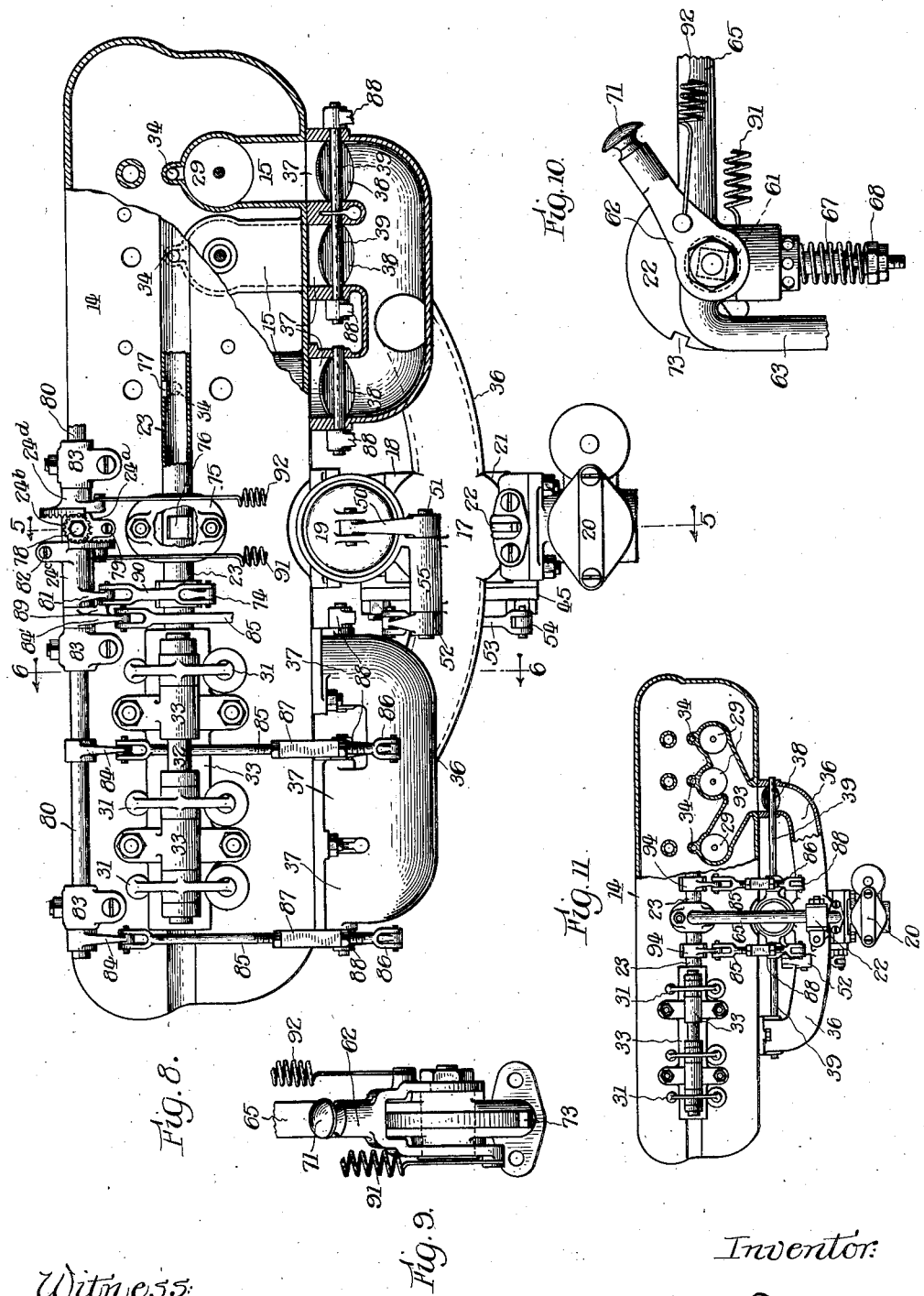
Inventor:
Homer A. Trussell
Witness:
A. J. Sauser Patented June 24, 1930

1,766,854

UNITED STATES PATENT OFFICE

HOMER A. TRUSSELL, OF CHICAGO, ILLINOIS

FUEL VAPORIZATION AND INDUCTION SYSTEM FOR INTERNAL-COMBUSTION ENGINES

Application filed June 29, 1922. Serial No. 571,776.

My invention relates to an improved fuel vaporization and induction system for internal combustion engines. The main objects being: to increase fuel efficiency to facilitate starting and warming up of a cold engine; to provide for a big power output at high speeds; and to increase smoothness of operation and longevity of the engine.

It is a further object of my invention to provide means for throttling the fuel charge adjacent engine cylinder inlets so that the correct quantity and quality of mixtures supplied and action of the fuel in ingress are best for giving the most efficient, flexible and powerful service.

Another object of my invention is to provide an improved device for throttling air in an internal combustion engine and for regulating the pressure of the air at the throttle so the fuel-air ratio and mixture formation are varied to meet the different operating requirements.

It is an object of my invention to provide an internal combustion engine with two passages regulated by throttle valves. One of said passages is adapted to convey either air or fuel, while the other conveys fuel only. When air is being conveyed through the said passage, the throttle valves are so operated that they open simultaneously for all passages, but when fuel is being conveyed in the two passages, the valve in one passage opens in advance of the other.

Another object of my invention is to provide in my improved device means for removing unvaporized fuel from the fuel charge, vaporizing it without using excess heat and conveying the vapors thereof to the combustion chambers through either the main fuel induction passage or through a bypass around the main fuel throttle.

Another object of my invention is to provide two fuel induction passages of different capacities and differentially operated valves to throttle the fuel charge admitted through these passages. The passage of smaller capacity receiving fuel from a place adapted to catch unvaporized fuel and being used primarily for conveying fuel with high velocity to assist vaporization and equalize apportionment for starting, warming and maximum flexibility at slow speed with a light load especially while the engine is cold. The passage of larger capacity being used principally for heavier engine loads and to gain high volumetric efficiency. The differential control of the valves permitting fuel to travel through the smaller passage first and permitting fuel to start through the larger passage before the smaller passage is open to its full capacity.

Another object of my invention is to provide a device for regulation of exhaust heating for fuel vaporization comprising a fully automatic, single operation, thermostatically governed, monovalve control of an exhaust bypass permitting substantially constant exhaust freedom irrespective of the percentage of exhaust gas passing through the bypass to the fuel heating elements.

I attain these and other objects by the mechanism illustrated in the accompanying drawings, in which the invention is shown as applied to a six cylinder, four cycle, internal combustion engine having inlet valves in a detachable head; it being understood however, that it is not limited to this particular type of engine, and it is obvious that the invention is applicable to engines employing any number of cylinders.

In the particular structure illustrated; the heat for vaporization is applied to a high pressure area, the additional air and the starting or fractional load mixture are supplied to the cylinder inlets through individual passages, the precise arrangement, however need not be adhered to as the structure is susceptible of various changes and modifications which may be made without departing from the spirit of the invention as expressed in the appended claims forming a part hereof.

The six cylinders are fundamentally alike; anything shown for any one cylinder is intended for all, as they differ only in the arrangement of the various parts. Similar numbers refer to similar parts throughout.

Figure 2:
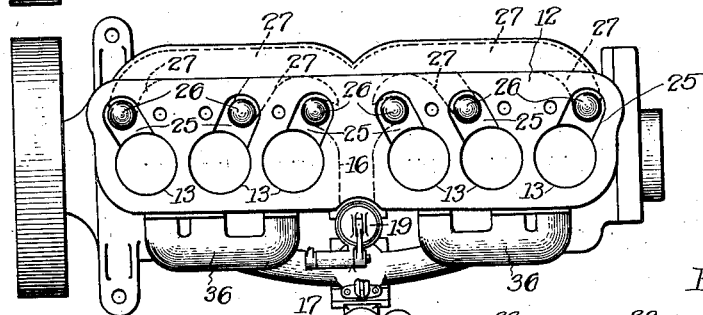
Figure 3:
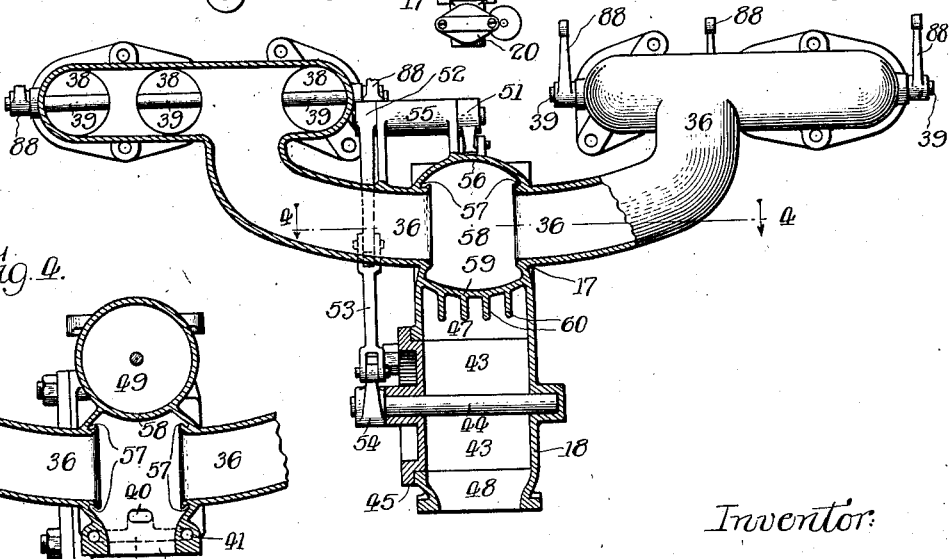
Figure 4:
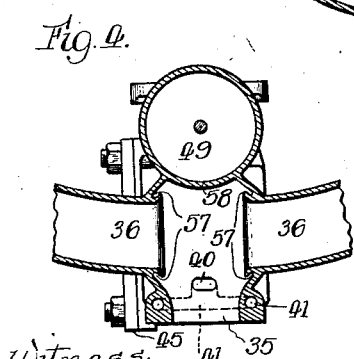

Referring to the drawings: Fig. 1, is a side elevation of an engine fitted with apparatus according to the invention; Fig. 2, a top plan view of the engine shown in Fig. 1, with the head removed and showing the manifold arrangement; Fig. 3, a longitudinal central section of the inlet manifold and exhaust by-pass valve on line 3—3 of Fig. 5; Fig. 4, a section of the inlet manifold on line 4—4 of Fig. 3; Fig. 5, a transverse section of the engine on line 5—5 of Fig. 8; Fig. 6, a cross section of the engine cylinder head and inlet manifold on line 6—6 of Fig. 8; Fig. 7, a view of the inlet manifold, exhaust by-pass and thermostat as in Fig. 5 but showing the parts as they will be when the inlet manifold is sufficiently heated; Fig. 8, a top plan view partially in section of the cylinder head with the inlet manifold assembly in place; Fig. 9, a top plan view of the regulator; Fig. 10, an end elevation of the regulator; and Fig. 11, a modification of the device shown as in Fig. 8.

The device illustrated comprises the engine 12, the cylinders 13, the cylinder head 14, the individual fuel inlet passages 15, the exhaust passage 16, the fuel heater and inlet manifold assembly 17, the exhaust control 18, the thermostat 19, the carburetor 20, the vaporizing chamber 21, the regulator 22, the distributor 23, and the differential throttle control 24ª to 24ᵈ inclusive.

The engine 12 is a conventional type with the valve operating cam shaft (not shown) in the crank case; the cylinders 13 are provided with the pockets 25; the exhaust valves 26 are interposed between these pockets and the individual exhaust passages 27 and are actuated by the tappets 28 which are in turn actuated by the cam shaft; the contributory exhaust passages 27 connect the individual cylinders 13 with the main exhaust passage 16 situated between the center cylinders and providing an exhaust outlet to the opposite side of the engine.

The cylinder head 14 contains the inlet valves 29 which are interposed between the inlets 15 and the cylinders 13; these valves are actuated by the tappets 28, the push rods 30 and the rocker arms 31; these arms are loosely mounted on the shafts 32, and these shafts are supported by the rocker arm brackets 33; the cylinder head and these brackets serve as a journal box and journal caps respectively for the distributor 23; the passages 34 connect this distributor with the fuel inlet passages 15, and the passages 15 connect the inlet manifold 17 with the individual cylinders 13.

The fuel heater and inlet manifold assembly 17 and the exhaust control 18 are integral; the manifold inlet 35 connects the carburetor 20 with the vaporizing chamber 21; the main inlet passage branches 36 connect the vaporizing chamber 21 with the individual outlets 37 which contain the butterfly valves 38, these valves are supported by the shafts 39; the vaporizing chamber outlet 40 connects with the passages 41 which encircle the inlet 35 and connect with the manifold outlet 42.

The exhaust control 18 contains the butterfly valve 43 which is movable upon the rotation of its shaft 44 extended through the removable side wall 45; also the exhaust control inlet 46, the by-pass 47 and the exhaust outlet 48.

The thermostat 19 is an air tight metal bellows partially filled with a volatile fluid, and having an internal pressure below atmosphere when cold; is secured to an extension 49 of the manifold 17, and is connected with the exhaust control valve shaft 44 by the arm 50 secured to one end of the shaft 51, the arm 52 secured to the opposite end of this shaft, the clevis rod 53, and the arm 54 secured to the shaft 44; the shaft 51 is supported by the manifold extension 55.

Fig. 5 shows the thermostat 19 contracted, and the exhaust control valve 43 in its extreme contraclockwise position (carburetor at your left), which provides for egress from the inlet 46 through the by-pass 47 to the outlet 48. Fig. 7 shows this thermostat expanded, and the exhaust control valve 43 in its extreme clockwise position, which closes the by-pass 47 and allows an unrestricted passage from the inlet 46 to the outlet 48.

The carburetor 20 is a conventional type preferably with a pneumatically controlled aperture through which fuel is emitted, but without a manually controlled throttle, and is attached to the manifold 17 to deliver fuel to the inlet 35.

The vaporizing chamber 21 is substantially spherical with its cupolalike top wall 56 terminating in the grooves 57 and the upright wall 58; these grooves are formed by bell mouthing the inwardly protruding parts of the main inlet passage branches 36; the heatable wall 59 is provided with the ribs 60 which project into the exhaust by-pass 47 to extend the heatable area of this wall.

The regulator 22 contains the valve 61 which is secured to the forked lever 62; the tube 63 provides communication from the manifold outlet 42 to this valve; the passage 64 admits air to this valve; and the tube 65 connects this valve with the distributor 23; the valve 66 restricts the air ingress to the passage 64, and the spring 67 is adjustable by moving the nuts 68 to vary this restriction. The pawl 69, the spring 70, the knob 71 and the slots 72 and 73 constitute a lock to hold the valve 61 in one of two positions: i. e., communication is established from the tube 63 through the valve 61 to the tube 65, and the passage 64 is shut off, when the lever 62 is placed so the pawl engages the slot 73; communication is established from the passage 64 through the valve 61 to the tube 65, and the tube 63 is shut off, when the lever 62 is placed so the pawl 69 engages the slot 72.

This locking mechanism may be removed from the regulator and incorporated in a control mechanism located at any convenient place.

The distributor 23 is a tube closed at both ends and loosely mounted in the cylinder head 14 so it may be turned therein upon movement of the arm 74 which is secured to this distributor; the flange 75 is provided on the tube 65 and forms a journal cap for the center of the distributor, this flange overlaps and air seals the port 76 which is open to the tube 65; the ports 77 in the distributor 23 provide variable openings into the passages 34.

The differential throttle control comprises the journal arm $24^a$, the idler pinion $24^b$, the gear quadrant $24^c$ and the gear quadrant $24^d$; the knob 78 is screwed on the end of the arm $24^a$ to hold the pinion $24^b$ in mesh with the gear quadrants $24^c$ and $24^d$, and also provides a convenient connection for a remote control; the journal arm $24^a$ is provided with the adjustable stop screw 79 and is free to turn on the shaft 80; the gear quadrant $24^c$ is also free to turn on this shaft and is provided with the arm 81 and the adjustable stop screw 82; the gear quadrant $24^d$ is secured to the shaft 80 which is supported by the brackets 83; the arms 84 are also secured to this shaft and are connected to the inlet manifold throttle valves 38 by the clevis rods 85 and 86 joined by the turnbuckles 87 forming adjustable links between these arms and the adjustable arms 88 secured to the shafts 39; the arm 84' is identical in construction and purpose with the arms 84, differing only in that the former is provided with a lug 89 to prevent the arm 84' from passing the arm 81 which is connected to the distributor arm 74 by the clevis rod 90; one end of the spring 91 is fastened to the regulator lever 62 below center, and the other end to the quadrant $24^c$; one end of the spring 92 is fastened to the regulator lever 62 above center and the other end to the quadrant $24^d$.

Tension of the spring 92 is greater than that of spring 91 when the regulator lever 62 is in position for the pawl 69 to engage the notch 73; thus the quadrant $24^d$ is held while the quadrant $24^c$ moves in the same direction as, but twice the distance of, the pinion $24^b$ if the knob 78 be moved in a clockwise direction (carburetor at your left); the quadrant $24^d$ remaining stationary until the stop screw 82 contacts with the cylinder head 14 when the quadrant $24^c$ stops and the quadrant $24^d$ follows if the movement of the knob 78 be continued; both quadrants $24^c$ and $24^d$, and consequently the distributor 23 and the inlet valves 38, ultimately come to full throttle position with the same movement of the knob 78 as in the following case. Tension of the spring 91 is greater than that of spring 92 when the regulator lever 62 is in position for the pawl 69 to engage the notch 72; consequently the quadrant $24^c$ tends to remain stationary and the quadrant $24^d$ to follow the journal arm $24^a$ if the knob 78 be moved in a clockwise direction, but the arm 84' cannot pass the arm 81 nor the quadrant $24^d$ pass the quadrant $24^c$ since they are respectively connected, hence the arms 81, 84 and 84' move with the knob 78 thereby turning the distributor 23 and the valves 38 simultaneously.

In starting the engine if same is cold; the regulator lever 62 should be placed so the pawl 69 engages the slot 73, thereby closing the air inlet 64 and connecting the passages 63 and 65 together, and increasing the tension of the spring 92 while decreasing the tension of the spring 91; and the knob 78 moved toward full throttle position (in a clockwise direction) not to exceed half way which will leave the throttle valves 38 closed, and will establish communication from the carburetor 20 through the vaporizing chamber 21, the regulator 22, and the distributor 23 to the individual cylinders through the individual passages 34 and 15. The small volume of fuel needed for starting and subsequently for idling and small power output at slow speed will be conveyed with high velocity from the vaporizer outlet 40 which, due to its location at the bottom of the vaporizing chamber 21, will receive any fuel in liquid or atomized form delivered to this chamber; the liquid fuel will be kept in ebullition in the passages 41 and will be spread on the walls of the upright passage 63 by the charge in ingress, and this high velocity in these passages of small wall area will break up the globules of fuel, thereby forming and delivering a good mixture to the cylinder inlets 15 and subsequently through the inlet valves 29 during the intake cycles of the engine.

Low temperature will contract the thermostat 19 and turn the exhaust control valve 43 so all of the exhaust gas from the cylinders will be directed through the bypass 47, thereby quickly heating the lower wall 59 of the vaporizer and completing vaporization of the fuel before it leaves the vaporizing chamber 21. Recondensation of the fuel will not occur—notwithstanding that the remainder of the induction system has not become heated—because of the high velocity of the charge in ingress.

Heat absorbed by the wall 59 is transmitted through the extension 49 to the thermostat 19 which is caused to expand; the expansion of the thermostat moves the valve 43 to reduce the opening between the passage 46 and the by-pass 47, and to increase the opening between the passage 46 and the outlet 48. When a predetermined temperature of the wall 59 has been reached, the thermostat will expand sufficiently to close the by-pass and provide an unrestricted passageway between the passage 46 and the outlet 48; remaining so until the temperature of the wall 59 decreases, when the thermostat will contract sufficiently to direct enough gas through the by-pass to maintain the desired temperature. The mass of metal in the vaporizing chamber, exhaust control 18 and the vaporizing chamber wall 59 may be so proportioned that the heat input to the vaporizing chamber 21 by transmission through the metal will be sufficient at normal maximum engine load, without having the exhaust control valve 43 open to the by-pass 47, which provides unrestricted egress through the exhaust control while the maximum volume of exhaust gas is being emitted.

Fuel is conveyed through the large inlet passages also, with the aforementioned starting adjustment, when the knob 78 is moved more than half way toward full throttle position which will open the valves 38 admitting fuel from the vaporizer chamber 21, through the manifold branches 36, the manifold individual outlets 37 and the individual cylinder inlets 15, past the valves 29 into the cylinders 13.

For extreme economy and flexibility at slow speed, especially on light loads and while the engine is warming up, the regulator 22 should be left in the adjustment used for starting. If the power demand made on a cold engine is big enough to employ the large induction passages before sufficient heat is available for thorough vaporization, then the wet portion of the charge will travel through the small passages and the gaseous portion will travel through the large induction passages. The high velocity and continuity of the charge through these small passages will accomplish considerable vaporization and even distribution of the fuel.

The manifold branches 36 are idle when the knob 78 has not been moved enough to open the valves 38, and absorb an excess of heat from the wall 59 which prevents wetting of their walls by condensation while these passages are idle or conveying a small charge and when the throttle valves 38 are opened thereby obviating the necessity of overrich mixtures.

In the conventional systems; the inlet passages are coolest when the engine is running with a small throttle opening, especially if the induction passage is exhaust heated,—exhaust heating is the most satisfactory economical method in use, because less heat is being generated then. When the throttle is opened the pressure in the inlet passage is suddenly increased which has the effect of increasing the boiling point of the fuel and causes recondensation, the condensed fuel is much heavier than the air, so the former lags behind and accumulates on the passage walls. More heat is needed to prevent condensation and wetting of the inlet passage walls than is available at low throttle unless heating is accomplished in a manner which will cause overheating of the charge at other times. Carburetors frequently are provided with some priming device or accelerating well to compensate for the lean mixture momentarily delivered to the cylinders, caused by this fuel lag or wetting of the passage walls; this practice wastes fuel and causes troubles concurrent with overrich and wet mixtures.

In systems which throttle the charge at the induction passage inlet, reciprocative pumping action occurs between the fuel inlet and the combustion chamber. Throttling the engine results in low pressure in the fuel inlet which draws unscavenged gas from the combustion chamber at the moment of inlet valve opening; this action being quickly followed by a reversal of flow into the combustion chamber, caused by the suction created by the piston as it progresses on the intake stroke.

Pressure in the distributor 23 and in the passages 37 is higher than in the passages 15, inasmuch as the distributor outlet ports 77 and the manifold outlet valves 38 throttle the charge in ingress at the individual entrances to the passages 15; low pressure in the passage 15 at the moment of closing of the inlet valves 29 permits fuel to enter the passages 15 from the passages 37 and from the distributor 23 until the pressures become equalized, thus the low pressure area is reduced to a minimum and the pressure increased in the reduced area of low pressure, and reciprocative pumping action is minimized.

Maximum pressure exists in the manifold when the engine is running with a small throttle opening, in either of the two adjustments of the regulator, and vaporization and distribution are properly accomplished; a drop in pressure occurs upon increasing the throttle opening, and this drop will be of several pounds if the throttle be opened suddenly, due to the sudden evacuation of the manifold; the low pressure has the effect of lowering the boiling point of the fuel, which precludes recondensation and wetting of the passage walls and also liberates an additional amount of vapor from any liquid which is in the vaporizer. And by the same token the chance of backfiring in the inlet manifold is reduced when sudden acceleration is made with a lean mixture.

When maximum economy is desired on moderate or heavy loads, more than flexibility on light loads; the regulator lever 62 should be placed so the pawl 69 engages the slot 72, thereby closing the passage 63 and connecting the passages 64 and 65 together, and increasing the tension of the spring 91 while decreasing the tension of the spring 92. Moving the knob 78 toward full throttle position, with this adjustment of the regulator, turns the throttle valves 38 and the distributor 23 simultaneously; fuel will be delivered through the large inlet passages, and air will be admitted by the valve 66 to the passage 65 and thence through the distributor outlet ports 77 to the passages 34 which emit the air adjacent the valves 29.

Admitting air with the charge is advantageous as a convenient means of varying the air fuel ratio; this varation being necessary to obtain maximum power and efficiency inasmuch as a richer mixture is needed for maximum power than that which gives maximum fuel efficiency. Slight resistance is offered to the incoming air by the valve 66 and can be varied by altering the tension of the spring 67 which should be adjusted to admit enough air to secure the highest speed obtainable with little or no load for a throttle opening sufficiently large to run the engine at about half its maximum speed.

The turnbuckles 87 are provided to adjust the valves 38 so they will open and close in unison, and to vary the proportion of fuel to air admitted for idling; the clevis rods 85 and 86 are provided with left and right threads respectively; screwing these turnbuckles onto these clevis rods opens the valves 38 without changing the position of the distributor 23 thereby admitting more fuel and relatively less air. The adjustable stop screw 79 is provided to correct the idling speed; turning this screw into the arm 24ª moves the throttle valves 38 and the distributor 23 simultaneously, thereby increasing the minimum idling speed of the engine but not causing any appreciable change in the ratio of fuel to air.

Pressure in any one of the individual passages 15 is not lowered by the suction created in the others, which results in a building up of pressure in the passages 15 between the successive operations of the respective intake valves 29. These passages are united by the manifold 17 and by the distributor 23 but suction in any one of these passages will not draw fluid from another one neither through the manifold nor the distributor. Pressure in the manifold passages 37 is always higher than in the passages 15, except for the pressure built up in the passages 15 by the inertia of the incoming fuel which occurs at high engine speeds with large throttle openings at the moment of inlet valve 29 closing; this pressure built up by the inertia aids in recharging the cylinders at the moment of inlet valve opening rather than equalizing with the lower pressure in another of the passages 15. The distributor port 76 is always open wide enough to exceed the requirements of the distributor ports 77, and the pressure is always higher in the regulator passage 65 and the distributor 23 than in the passages 15 except when the engine is delivering a high torque when the inlet valves 38 will be open wide enough to admit fuel from the passages 37 so easily that suction in the distributor 23 will not be sufficient to lift the valve 66 off its seat.

Low pressure having been created in the passages 15, during the intake cycle of the corresponding cylinders, continues to draw fuel from the passages 37, and air through the passages 34; the pressure increasing to about that which exists in the cylinders at time of inlet valve 29 opening, this will prevent the residual gas in the cylinders 13 from suddenly entering the passages 15, which would cause turbulence and dilution of the new charge with exhaust gas; (the admixture of burnt gas with the working charge greatly reduces efficiency, and the mechanical power loss involved in pumping fluid from the cylinder to the inlet passage and vice versa is not negligible.) These fluid charges will be stratified; the air being in contact with the valves 29 will be the first to engage the residual gases in the cylinders 13 and will aid the increased pressure (increase over that which exist in the induction passage of the conventional systems at the moment of inlet valve opening) to lessen commingling of the two gases; this stratification and additional air increases fuel efficiency by: mitigating diffusion of the new and old charges; bolstering up compression of the working charge; furnishing an excess of oxygen over that required for complete combustion; retarding the drop in pressure and temperature of the working charge within the cylinders.

Opening the throttle, i. e. moving the knob 78 in a clockwise direction, admits an increased amount of fuel and air; but relatively less air if the throttle be opened more rapidly than the engine can increase its speed, due to the restriction of the valve 66; no air will be admitted by this valve if the throttle be opened wide enough at a sufficiently slow engine speed to permit an easier way of ingress past the valves 38 than past the air inlet valve 66; but the ratio of air to fuel will increase as the engine speed increases with a given throttle opening; thus as much air as can be used to advantage is automatically admitted with the incoming fuel; and an undiluted charge is delivered from the carburetor 20 to the cylinders 13 when the maximum torque is required.

Conventional systems with hot spots or hot walls which do not impede the unvaporized fuel in transit serve more to heat the air or gaseous charge than to vaporize fuel by the direct application of heat to the unvaporized fuel because globules of fuel roll or bounce off a hot surface, due to the gas liberated between the liquid and the heated area. Excessive heat must be used to vaporize liquid or atomize fuel in transit as the period of contact with any heated surface is small, hence air is unnecessarily overheated. Liquid fuel can be thoroughly vaporized at temperatures below their end point boiling temperature by retaining the liquid on a hot surface and circulating air or gas above it: normal operating temperatures are sufficiently high to prevent recondensation of fuel after the charge is in gaseous form.

Fuel from the carburetor 20 traverses the passage 35 and enters the vaporizing chamber 21, wherein the fuel is retarded, due to the sudden enlargement of this chamber; this retarding, and the pulsation and continual reversal of direction of the fuel in this chamber, due to the alternate aspiration in the manifold branches 36, causes unvaporized fuel to precipitate onto the hot wall 59 where it is retained until vaporized, when it again joins the charge in ingress; and the gaseous charge is not impinged against any heated surface; hence the latent heat of vaporization is small. Supplying the engine combustion chambers with dry gas improves fuel efficiency, and smoothness of operation and longevity of the engine. (Low fuel efficiency generates an excess of carbon which aggravates detonation; and wet mixtures in the combustion chambers cut the oil film on the cylinder wall and cause crank case oil dilution; either of which makes a harsh running engine, and causes rapid wear.) Any fuel which might recondense on the upright wall 58 or the top wall 56 will be kept out of the passages 36 by the grooves 57 and conveyed by gravity and capillarity to the sump of the vaporizing chamber where it is vaporized by the direct application of heat.

Conventional multiple cylinder engines fail to deliver the proper ratio of power and efficiency as compared with the performance of a single cylinder engine of similar design; whereas the power and efficiency of each cylinder should be increased by grouping, because of the proportionate reduction of frictional and inertia elements; it is reduced instead, due principally to; cramped and restricted fuel inlet passages; uneven distribution of fuel; overheating of the fuel vapor; fuel lag, or wetting of the induction passage walls; reciprocative pumping action.

In a construction where the charge is throttled between the carburetor and the induction passage inlet; finely atomized fuel leaving the carburetor condenses upon contact with a partially closed throttle valve and enters the induction passage partly as a film on the passage walls and partly as coarse spray off the edge of the throttle valve.

Distribution of charges of even mixture strength to all of the cylinders is accomplished by vaporizing the fuel in the vaporizing chamber 21 prior to its contact with a throttle valve; which vaporizes the fuel before the finely atomized portion of the charge received from the carburetor has become condensed. Fuel is throttled by the valves 38, and also by the distributor 23 when the regulator 22 is in the first mentioned adjustment, after vaporization and distribution have been accomplished; any condensation which might occur at the valves 38 or the distributor ports 77 cannot, therefore, affect the apportionment and mixture strength of charges delivered to the cylinders.

Elimination of reciprocative pumping action, minimization of induction passage wall wetting or fuel lag, and thorough vaporization the fuel permit the use of large induction passages without sacrificing fuel efficiency. Large induction passages and small latent heat of vaporization improve volumetric efficiency and provide for a big power output.

The vaporizing chamber 21 and the passages 36 serve as a reservoir for the preformed charge which is contained therein at substantially atmospheric pressure. This chamber or these passages, or both the chamber and passages, may be made much larger than is necessary to convey sufficient volume of fuel to meet maximum power demands; thereby increasing their storage capacity and reducing the possibility of carrying unvaporized fuel into the combustion chambers under maximum load conditions.

The preformed charge is always ready for immediate acceleration, during normal engine operation, and gives the engine great accelerating ability with the normal fuel air mixture without the aid of any priming action from the carburetor. And the demand made on the carburetor for a larger volume of fuel increases gradually, due to the elasticity of the fuel in the vaporizing chamber 21 and the passages 36, which permits atomized fuel and portions of the charge heavy with fuel vapor to be accelerated and carried from the carburetor to the vaporizing chamber with the lighter portions of the charge.

Whereas, in conventional systems which throttle the charge at the carburetor: low pressure existing in the induction system will, upon suddenly increasing the fuel throttle valve opening, abruptly demand more fuel from the carburetor with the obvious result that air and lighter portions of the fuel charge will be first to respond to this sudden acceleration, and a lean mixture will be delivered at a time when a normal mixture or a rich mixture is most needed; this mixture gradually increasing in richness as the inertia of the liquid fuel in the carburetor jets and the atomized fuel in the charge can be overcome, and the combustion chambers will receive a power producing mixture but only after the induction passages have become wet with fuel which will later be taken into the engine when not needed.

The modification shown in Fig. 11 is identical in construction and purpose with the device described in the foregoing part of this specification; differing only in that the differential throttle control has been eliminated; and that the six individual passages 15 are formed in two triplex passages 93; and that the two manifold branches 36 each have a single outlet supplied with a butterfly valve 38 to throttle the charge admitted to each of the passages 93. The two arms 94 are secured to the distributor 23 and are connected with the arms 88 on the butterfly valve shaft 39 by the clevis rods 85 and 86; and the distributor 23 and the valves 38 always move in synchronism.

Employing two throttle valves in the modified construction instead of six as in the preferred construction simplifies the device, but the low pressure area of the passages 93 is larger than that of the passages 15, consequently reciprocative pumping action will be slightly more in the former but not nearly so great as in conventional systems.

Inlet valves 29 are open for about 200 degrees of crank rotation which will allow about 40 degrees lapse between the closing of one and the opening of another in each of the passages 93. Fuel continues to enter the passages 93 and fuel or air, depending on which adjustment of the regulator 22 is being used, continues to enter the passages 93 through the distributor passages 34 during this lapse between aspiration of the cylinders; which increases pressure in the passages 93. Either of the passages 93 comprise only about a quarter of the total essention displacement of the fuel induction system, hence this pressure increase is appreciable and conduces toward the advantages ascribed to the preferred construction.

Distribution of fuel to the three cylinders fed by either of the passages 93 is made after the fuel has passed the throttle valves 38 but difficulty will not be experienced in apportioning charges of equal mixture strength because of the reduced area and uniform pressure of the passages 93 and because the valves 38 are throttling a dry gaseous charge.

When heating is insufficient for proper vaporization, the unvaporized fuel from the vaporizing chamber 21 is delivered to the passage 93 adjacent the inlet valves 29 through the regulator 22, the distributor 23 and the passages 34; part of the fuel is vaporized en route and distribution of the fuel is accomplished before the charge is admitted to the passages 93.

Having thus described the invention, what I claim and desire to cover by Letters Patent is:

1. In an internal combusion engine, means for conveying combustible mixture to the combustion chamber through a small passage while the engine is running with a small throttle opening, means for conveying combustible mixture to said combustion chamber through a large passage while the engine is running with a large throttle opening, and means for conveying air to said combustion chamber through said small passage while the combustible mixture is being conveyed through said large passage.

2. In an internal combusion engine, means for conveying fuel to the combustion chamber inlet through a passage containing a throttle valve, means permitting either air or fuel to be conveyed to said combustion chamber inlet through another passage containing a throttle valve, and means adapted to open said throttle valves simultaneously while air is being permitted to be conveyed through said second mentioned passage, said last mentioned means being also adapted to open said second mentioned throttle valve in advance of said first mentioned throttle valve while fuel is being permitted to be conveyed through said second mentioned passage.

3. In a fuel induction system for a multiple cylinder engine, means for removing unvaporized fuel from the fuel charge, a passageway for conveying said fuel charge to the engine cylinders, and means including another passageway for vaporizing and conveying said unvaporized fuel to the engine cylinder inlets through individual throttle valves situated adjacent the respective engine cylinder inlets.

4. In an internal combustion engine, means for conveying fuel to the combustion chamber inlets through a small passage and simultaneously operable means for admitting fuel to the combustion chamber inlets through a larger passage and for shutting off fuel and conveying air to said combustion chamber inlets through said small passage.

5. In an internal combustion engine, means for conveying fuel to the combustion chamber inlet through a passage, means for conveying air to said chamber through a second passage and simultaneously operable means for shutting off said fuel and air in said passages and admitting fuel only through said second passage.

6. In an internal combustion engine fuel system, means for removing unvaporized fuel from the fuel charge, a passageway for conveying said fuel charge to engine cylinder inlets, and means for vaporizing said unvaporized fuel and conveying the vapors thereof to the engine cylinder inlets through a plurality of throttle valves situated adjacent said cylinder inlets.

7. In an internal combustion engine fuel system, means for removing unvaporized fuel from the fuel charge, a passageway for conveying said fuel charge to engine cylinder inlets, and means for vaporizing said unvaporized fuel and conveying the vapors thereof to the engine cylinder inlets through a plurality of throttle valves situated adjacent said cylinder inlets said means including application of heat and another passageway.

8. In an internal combustion engine fuel system, means for supplying the fuel charge to the engine intake, a throttle valve for said charge between said means and said intake, a fluid bypass for said charge around said throttle valve and means for admitting auxiliary air to the engine intake through a portion of said bypass.

9. In an internal combustion engine fuel system, a vaporizing chamber situated between the fuel throttle valve and the means for carbureting air with fuel, means permitting vaporized fuel to travel through said vaporizing chamber, means for vaporizing fuel in said vaporizing chamber, and a fluid bypass around said throttle valve, said bypass connecting said vaporizing chamber with the fuel induction passage immediately adjoining the engine combustion chamber inlet.

10. In an internal combustion engine fuel system, means for supplying the fuel charge to the engine intake, a throttle valve in said supply means, a fluid bypass around said throttle valve and means for cutting off the flow of fuel charge through said by-pass and for admitting uncharged air to said bypass between said throttle and the engine intake.

11. In an internal combustion engine fuel system, means for supplying the fuel charge to the engine intake, a throttle valve in said supply means, a fluid by-pass around said throttle valve, means for admitting auxiliary air to the engine intake through a portion of said bypass, and a throttle valve in said by-pass between said means for admitting air, and the engine intake.

12. In an internal combustion engine fuel system, means for supplying a fuel mixture to the engine inlets, means for supplying a relatively rich fuel mixture to said engine inlets, and adjusting means to establish the proper fuel mixture ratio for the respective engine inlets comprising auxiliary throttle valves at said engine inlets and a spring loaded auxiliary air inlet valve.

13. In an internal combustion engine fuel system, a passage for supplying fuel to the engine, means for blocking the flow of fuel through said passage and permitting auxiliary air to pass therethrough, and means for supplying air carbureted with fuel to said engine inlet comprising a second passage having means therein for vaporizing unvaporized fuel particles.

14. In an internal combustion engine fuel system, means for removing unvaporized fuel from the fuel charge, a passageway for conveying said fuel charge to the engine cylinders, and means including another passage way for vaporizing said unvaporized fuel and conveying the vapors thereof to the engine cylinder inlets through a plurality of throttles situated adjacent the engine cylinder inlets.

15. In an internal combustion engine fuel system, means for carbureting air with fuel, a passage having a valve therein to throttle fuel between said carbureting means and the engine inlet, a second induction passage leading to said engine inlet, means for admitting air to said second passage and means adapted to connect said second passage with either said carbureting means or with said means for admitting air.

16. In an internal combustion engine fuel system, a carburetor, a passage having throttle valve therein from said carburetor to the engine inlets, a separate induction passage leading to the engine inlets, means for admitting air to said second passage, means adapted to connect said second passage with either said carburetor or said means for admitting air, and means adapted to close the valve in said first passage to obtain idle running while said second passage is connected with said carburetor and for partially closing said valve to obtain idle running while said second passage is connected with said means for admitting air.

17. In an internal combustion engine fuel system, a throttle valve in the induction passage, a by-pass around said valve and means for delivering auxiliary air through said by-pass to a point immediately adjacent the inlet to the combustion chamber.

18. In an internal combustion engine fuel induction system, two fuel induction passages of different capacities, a throttle valve in each of said passages to vary the volume of fuel delivered to meet the power demand, a means for simultaneously controlling both of said throttle valves, said means automatically opening said valve in the smaller of said passages in advance of said valve in the larger of said passages, and means independent of the first mentioned means for stopping the delivery of fuel through the smaller of said passages while permitting the delivery of fuel through the larger of said passages.

19. In combination with an internal combustion engine provided with a combustion chamber and a carbureter, a main combustible mixture passage connecting said carbureter with said combustion chamber, a throttle valve in said passage adjacent said combustion chamber, a by-pass around said throttle valve, a second throttle valve in said by-pass, and means connecting said throttle valves for simultaneous movement, said connecting means opening said second throttle valve in advance of the first throttle valve whereby to prevent inspiration of the combustible mixture in said main passage between said combustion chambers and said first mentioned throttle valve.

20. In an internal combustion engine fuel system, means for carbureting air with fuel, a passage for conveying said carburized air to a cylinder inlet, a throttle valve in said passage between said carbureting means and said inlet, a by-pass around said valve, a throttle valve in said by-pass, said valves being connected for interrelated movement, and means for blocking said by-pass to the passage of said carburized air independently of said valves.

21. In an internal combustion engine fuel system provided with an intake port in the cylinder thereof, a carbureter, a fuel passage extending from said carbureter to said intake port, a throttle valve in said passage, a by-pass for by-passing fuel past substantially the full length of said passage around said valve, and means operatively dependent upon the relative position of said throttle valve in said passage for throttling the fuel in said by-pass at a point adjacent said intake port.

22. In an internal combustion engine fuel system, means common to a plurality of combustion chambers for supplying the fuel charge thereto, valves for throttling said fuel charge close to the inlets to said combustion chambers, means for admitting air substantially at said inlets, and automatic means regulating the supply of said air.

23. In a fuel induction system for a multiple cylinder engine, means common to a plurality of said cylinders for supplying the fuel charge thereto, valves for throttling said fuel charge close to the inlets to said cylinders, by-passes around said throttle valve, means for admitting air to said by-passes, and valves in said by-passes for controlling the flow of said air into said by-passes.

24. In a multiple cylinder internal combustion engine, two induction passages for conveying the fuel to each of the combustion chamber inlets and a separate throttle valve in each of said passages close to said combustion chamber inlets.

25. In an internal combustion engine fuel system, a passage for delivering either fuel or air to the engine inlet, and means for supplying air carbureted with fuel to said engine inlet comprising a second passage having means for the vaporization of liquid fuel particles accumulating therein.

26. In an internal combustion engine, in combination, a plurality of cylinders each having an inlet port, an unvaporized fuel separation and collection chamber, a plurality of passages connecting said chamber and said inlet ports, a carburetor, a passage connecting said chamber and said carburetor, a throttle valve in each of said plurality of passages, by-pass means around said throttle valves connecting said chamber with each of said plurality of passages close to said inlet ports, means for directing exhaust gases into contact with the exterior walls of said chamber, and thermostatically controlled means for controlling the application of said exhaust gases to said chamber.

27. In combination with an internal combustion engine having a plurality of cylinders each of which is provided with an inlet port, a liquid fuel separating and collecting chamber, a passage connecting each of said inlet ports with said chamber, a carburetor, a passage connecting said carburetor with said chamber, a throttle valve in each of the first mentioned passages, an auxiliary distributor passage connected to each of said first mentioned passages between said valves and said ports, a passage connecting said chamber with said auxiliary distributor passage, means for throttling the passage of gas through said auxiliary distributor passage to said first mentioned passages, and means operatively connecting the last mentioned means with said throttle valves constraining operation of said last mentioned means in advance of said throttle valves upon opening of said throttle valves.

28. In combination with an internal combustion engine having a plurality of cylinders each of which is provided with an inlet port, a liquid fuel separating and collecting chamber, a passage connecting each of said inlet ports with said chamber, a carburetor, a passage connecting said carburetor with said chamber, a throttle valve in each of the first mentioned passages, an auxiliary distributor passage connected to each of said first mentioned passages between said valves and said ports, a passage connecting said chamber with said auxiliary distributor passage, means for throttling the passage of gas through said auxiliary distributor passage to said first mentioned passages, and means operatively connecting the last mentioned means with said throttle valves constraining operation of said last mentioned means in advance of said throttle valves upon opening of said throttle valves, said connecting means being operable to open said auxiliary passage to the air.

29. In an internal combustion engine fuel system, in combination, means for carbureting air with fuel, passages for conducting said air and fuel from said means to the engine inlets, a plurality of valves in said passages adjacent said inlets to throttle said air and fuel passing through said passages, a fluid bypass for bypassing said air and fuel around said valves, means for throttling said air and fuel admitted to said inlets through said bypass, and means connecting said bypass throttling means and said valves for inter-related movement.

30. In an internal combustion engine, in combination, a fuel induction passage, an exhaust passage having an offset pocket therein provided with a wall common to said induction passage, and a valve co-operating between said pocket and the main body portion of said exhaust passage operable to completely cut off said pocket from said main body portion or to deflect the gases flowing through said main body portion into said pocket.

31. In an internal combustion engine, in combination, a fuel induction passage, an exhaust passage having an offset pocket therein provided with a wall common to said induction passage, and a valve co-operating between said pocket and the main body portion of said exhaust passage, said valve when in one position cutting off the circulation of exhaust gases from said main body portion through said pocket, and when in another position blocking off the direct flow of exhaust gases through said main body portion and serving as a baffle within said pocket for directing the flow of said exhaust gases therethrough.

HOMER A. TRUSSELL.